June 11, 1940.  S. M. ANDERSON  2,204,114
AIR CONDITIONING SYSTEM UTILIZING REFRIGERATION
Filed July 2, 1936  2 Sheets-Sheet 1
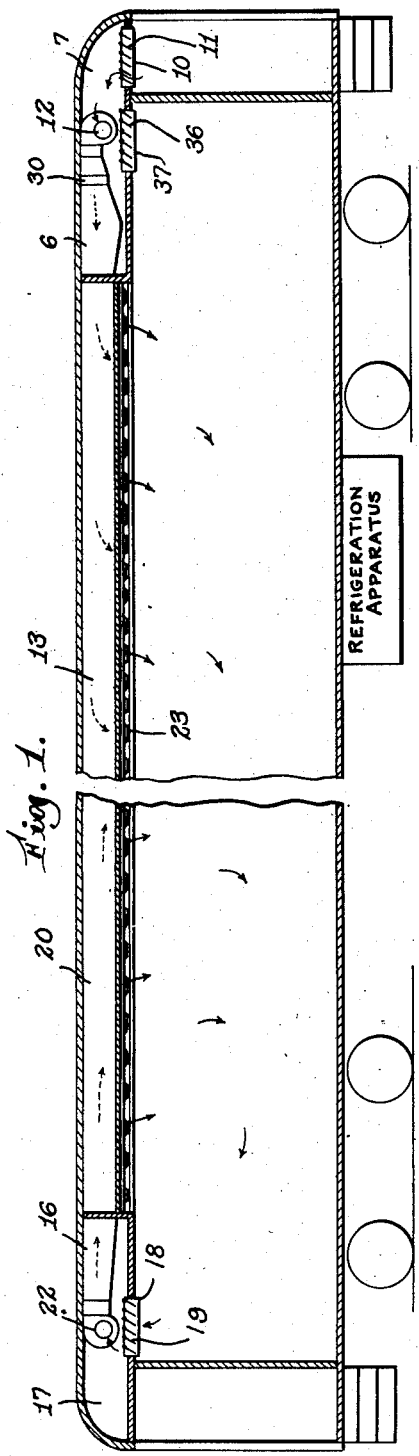
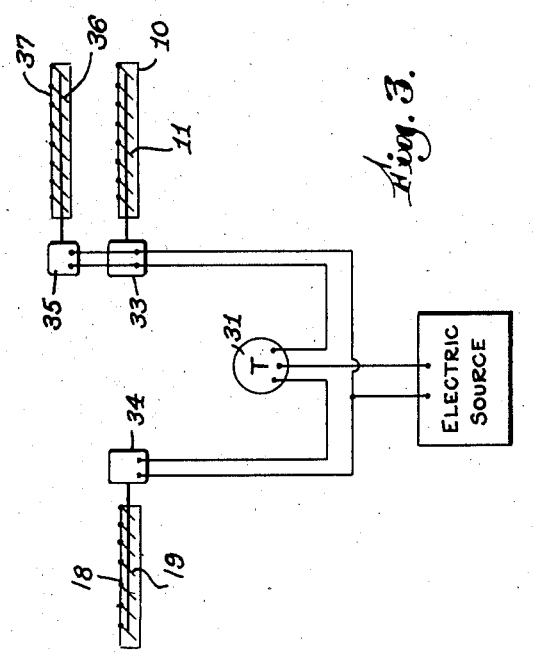
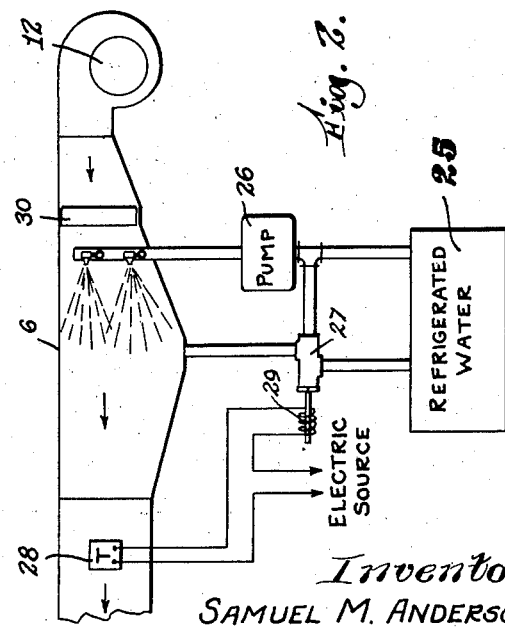
Inventor
SAMUEL M. ANDERSON
by Robert T. Palmer
Attorney June 11, 1940.  S. M. ANDERSON  2,204,114
AIR CONDITIONING SYSTEM UTILIZING REFRIGERATION
Filed July 2, 1936  2 Sheets-Sheet 2
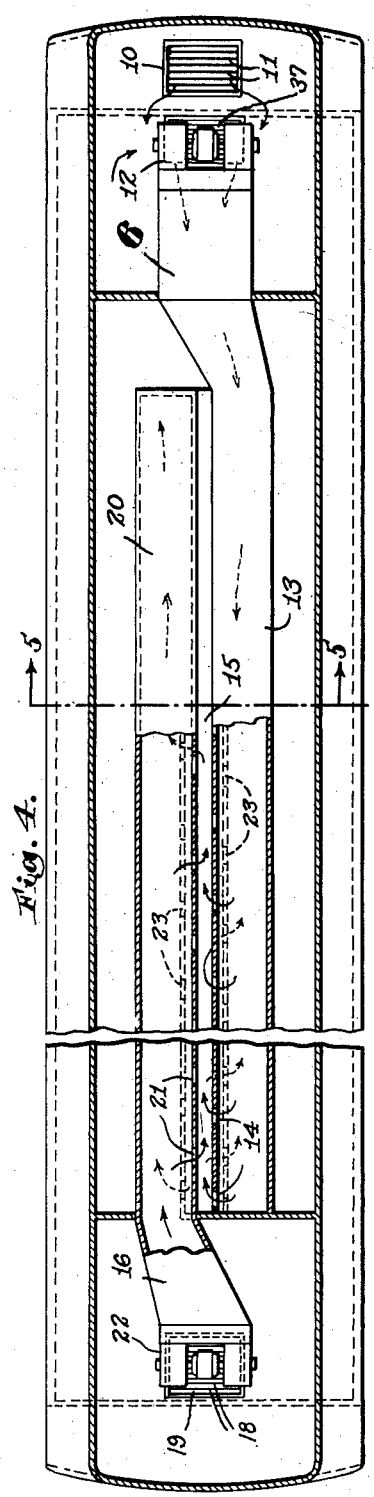
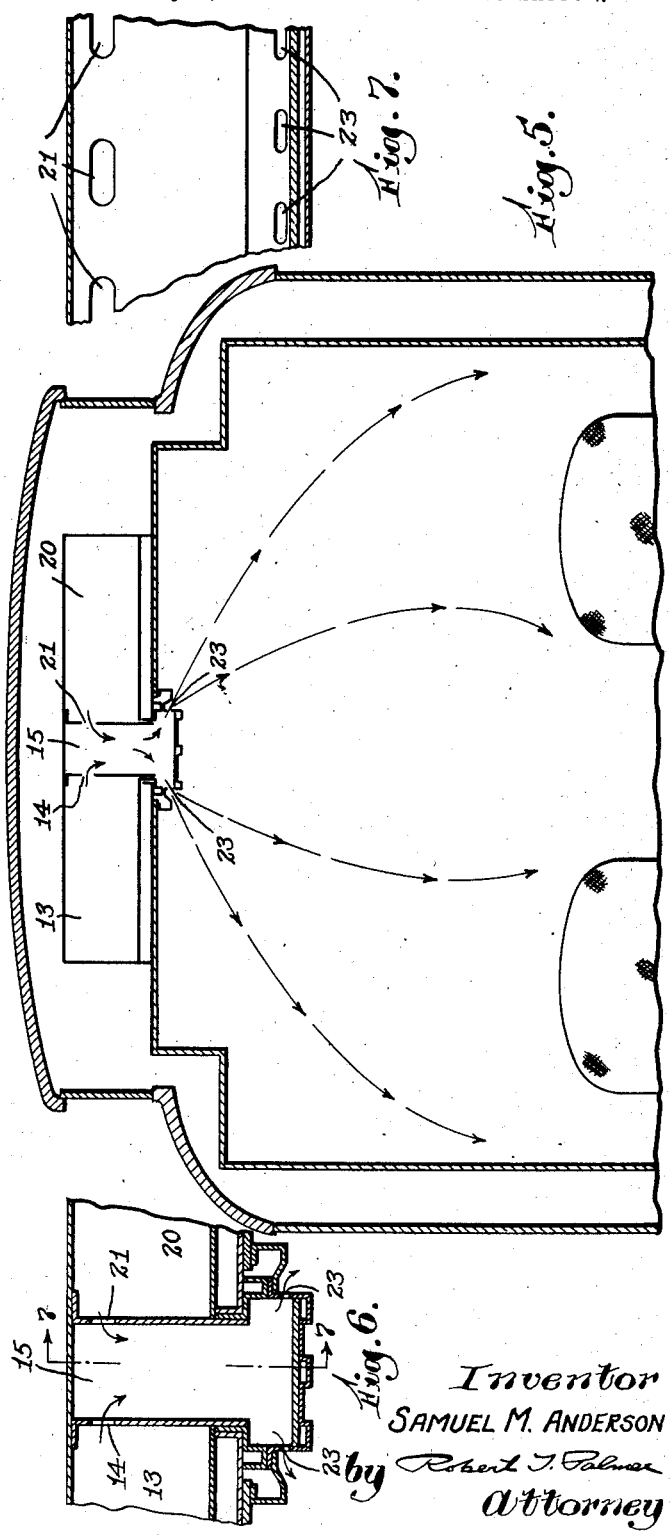
Inventor
SAMUEL M. ANDERSON
by Robert T. Palmer
Attorney Patented June 11, 1940

2,204,114

UNITED STATES PATENT OFFICE 2,204,114

AIR CONDITIONING SYSTEM UTILIZING REFRIGERATION

Samuel M. Anderson, Sharon, Mass., assignor to B. F. Sturtevant Company, Boston, Mass.

Application July 2, 1936, Serial No. 88,581

4 Claims. (Cl. 98—10)

This invention relates to air conditioning systems for passenger vehicles and relates more particularly to an air conditioning system utilizing refrigeration, in which recirculated air is mixed with the conditioned air prior to its discharge into the passenger space.

In passenger vehicles such as railroad passenger cars, it has not been the practice to chill the air in the dehumidifiers to as low a dew point as comfort standards demand in buildings. One reason has been that the space for equipment is so limited that space for the usual by-pass ducts and mixing chambers for the reheating of too cold, properly dehumidified air is not available. Another reason is that the railroads have taken the attitude because of the expense involved, that any conditioning system was sufficient if it only cooled the air, and certainly a poor cooling system is better than none at all. Some reheating of the dehumidified air has been accomplished by its contact in its travel between the points of discharge and the passenger space, with the warmer air overlying the passenger space, but as a general rule, it has been the practice to merely cool the air and then discharge it into the passenger space, with no provision for tempering it, and without much dehumidification.

Another disadvantage of the present type of railroad car conditioning systems is that the conditioner is generally located in one end of the car, with the result that there is unequal distribution of the conditioned air along the length of the car, and the passengers at the far end are not adequately served.

According to this invention, a dehumidifier unit located in one end and in the roof zone of a passenger vehicle, chills outside air to an adequately low dew point for proper dehumidification. In the roof zone of the other end of the vehicle, there is located a blower unit handling recirculated air. A central overhead air duct having two outer air passages and a central air passage is provided. The dehumidifier unit discharges into one outer passage. The blower unit discharges into the other outer passage. The air from the two outer passages flows into and mixes in the central passage from which latter passage, the mixed air is discharged into the passenger space. This provides an adequate by-pass effect where adequate space is available.

It has been determined that the present invention not only enables properly dehumidified air to be reheated by recirculated air, but the passengers in both ends of a railroad car receive the same volume of air, and less cooling at the dehumidifier is required due to the circulation of a larger volume of air than has been the practice in the past.

The invention will now be described with reference to the drawings of which:

Fig. 1 is a side view in section, of a railroad passenger car equipped according to this invention;

Fig. 2 is a diagrammatic view of the spray type conditioner and its connection to the refrigeration apparatus;

Fig. 3 is a diagrammatic view of the damper controls employed;

Fig. 4 is a plan view in section looking downwardly upon the car of Fig. 1;

Fig. 5 is a transverse section along the lines 5—5 of Fig. 4;

Fig. 6 is an enlarged view of the central portion of the duct arrangement of Fig. 5, and Fig. 7 is a sectional view along the lines 7—7 of Fig. 6.

In the right hand end of the car, the spray type dehumidifier, indicated generally by 6, is mounted as shown, completely above the passenger space. Outside air enters the air tight compartment 7 in which the dehumidifier 6 is mounted, through the inlet 10 in the car vestibule. This inlet is provided with adjustable dampers 11 for varying the volume of air. The dehumidifier 6 acts to chill the outside air passing through it under the action of the fans 12, to a relatively low dew point which may be 55° F. The dehumidified air is then discharged into the duct 13 shown more clearly by Figs. 4 and 5. This duct 13 is provided with the plurality of relatively small spaced outlet openings 14, which open into the central supply duct 15.

Mounted in the roof zone of the other end of the car is the blower unit 16 which is mounted in the air tight compartment 17. This blower unit receives recirculated air through the inlet opening 18 which is provided with the adjustable dampers 19. The blowers 22 draw recirculated air through the opening 18 and force it into the longitudinal duct 20, shown more clearly by Figs. 4 and 5. This duct 20 is provided with the plurality of relatively small spaced openings 21 which communicate with the central supply duct 15 at points opposite the line of outlet openings 14 in the longitudinal duct 13.

The relatively small outlet openings 14 and 21 in the ducts 13 and 20 are so sized and spaced that they discharge into the central supply duct 15 at relatively high velocity. This enables considerable fresh energy to be built up by the blowers 12, in the duct 13, and by the blowers 22, in the duct 20. This provides that substantially equal volumes of air discharge from each of the outlet openings 14 and 21 regardless of their distance from their respective blowers.

The cold dehumidified air from the duct 13 enters the central supply duct 15 through the small outlet openings 21 and the recirculated air from the passenger space enters the central supply duct 15 from the duct 13 through the outlet openings 14. The recirculated air and the dehumidified air as stated before, enter the central supply duct 15, under pressure at relatively high velocity, and so mix intimately with the air in the duct 15. The mixed air is then discharged from the plurality of outlet openings 23 in the central supply duct 15 as indicated by the arrows of Fig. 5. The spacing and the size of the outlet openings 23 is so chosen that the air discharged into the passenger space is not at so high velocity as to cause drafts, but on the other hand a general positive diffusion of the conditioned air takes place uniformly throughout the entire length of the car.

The dehumidifier 6 as shown by Fig. 2 is supplied with refrigerated water from the source 25 under action of the pump 26 and under control of the valve 27. The thermostat 28 is placed at the outlet of the dehumidifier 6 and acts as a dew point control and adjusts the valve 27 by means of the solenoid 29 to maintain the desired dew point in the air leaving the dehumidifier. This is a standard type of control and the thermostat 28 operates to cause the dehumidifier 6 to draw more or less refrigeration from the source 25 when this need is indicated by changes in the temperature of the air leaving the dehumidifier. The filters 30 are spaced between the blowers 12 and the dehumidifier 6.

With reference to Fig. 3, the thermostat 31 of the dry bulb type is mounted within the passenger space and acts to control the proportions of recirculated to dehumidified air which enter the passenger space. As the temperature increases above that desired, the thermostat 31 operates to cause the damper control motor 33 to adjust the dampers 11 in the fresh air inlet 10, and to cause the motor 34 to adjust the dampers 19 in the recirculated air inlet 18, to cause more air to enter the dehumidifier 6, and simultaneously adjusts the damper control motor 35 to adjust the dampers 36 in the recirculated air inlet opening 37 to admit less recirculated air into the unit 16. The controls are so arranged that the volume of air discharged into the car is constant. When the temperature decreases below the desired standard, the thermostat 31 then acts to decrease the amount of dehumidified air and to increase the amount of recirculated air.

It has been found that despite the fact that two sets of blowers 12 and 22 of substantially similar size are provided, each of the sets of blowers may handle substantially the amount of air now being handled by the one set of blowers in each existing system. Due to the fact that the dehumidified air is tempered with warm air before being discharged into the passenger space, larger air volumes may be employed effectively without discomfort or the production of drafts. The larger volume of air provides a greater cooling effect with less refrigeration due, of course, to the increased air movement. The large volume is introduced into the passenger space, and a small volume exhausted from the car, the exhaust being in the usual manner.

The thermostat control employed, also enables the refrigeration plant to be operated at minimum expense. When less cooling is required, a greater volume of recirculated air is used, and less air is dehumidified. Then, when more cooling is required, the system operates automatically to dehumidify more air, and to recirculate less.

This type of automatic control can be advantageously employed in passenger vehicles of the railroad car type because of the fact that the passengers themselves do not contribute the major load as do the occupants in a motion picture theater, for example. On the other hand, the load changes are chiefly due to movement of the train through different climatic conditions. Change of direction and change of the wind, have some effect. So, controls which respond to changes in the number of passengers such for example, as are employed in motion picture theaters, and such as shown by the Lewis Reissue Patent 16,611 are not necessary.

Due both to the fact that substantial static pressure is built up in both of the supply ducts 13 and 20 and the fact that blower units discharge from both ends of the car, passengers at any point in the car, regardless of their distance from the blower units, are supplied with the same volume of air, and with air having the same condition.

While one embodiment of the invention has been described for the purpose of illustration, it should be understood that the invention is not to be limited to the exact arrangement described, as many departures and modifications will suggest themselves to those skilled in the art, after having had access to this disclosure.

What is claimed is:

1. Air conditioning apparatus for a vehicle having a passenger compartment, comprising an air cooler, means for admitting the air to be cooled into said cooler, a longitudinal air distributing duct extending over said compartment, means forming two substantially parallel air passages in said duct, means for admitting air from said cooler into one of said passages, means for admitting recirculated air from said vehicle into the other of said passages, means for mixing the air from one of said passages with the air from the other of said passages at a plurality of longitudinal points in said duct, and means for discharging the mixed air at a plurality of longitudinal points into said compartment.

2. Air conditioning apparatus for a vehicle having a passenger compartment, comprising an air cooler, means for admitting outdoor air into said cooler, means including one air passage for discharging the air from said cooler at relatively high velocity at a plurality of longitudinal points overhead said compartment, means including a second air passage substantially parallel to said first passage for supplying recirculated air from said compartment for mixture at said points with the air from said cooler, and means including a third passage substantially parallel to said passages for supplying the mixed air at relatively low velocity into said compartment.

3. Air conditioning apparatus for a vehicle having a passenger compartment, comprising an air cooler, means for admitting outdoor air into said cooler, means forming a first air passage connecting with said cooler and extending over said compartment, means forming a second air passage extending overhead said compartment alongside said first passage, means for admitting recirculated air from said compartment into said second passage, and means for mixing air from said first passage with air from said second passage and for distributing the mixed air at a plurality of points into said passenger compartment.

4. Air conditioning apparatus for a vehicle having a passenger compartment, comprising an air cooler in one end of said vehicle, means for admitting outdoor air into said cooler, means forming a first air passage connecting with said cooler and extending over said compartment, means forming a second air passage extending overhead said compartment alongside said first passage, a blower in the other end of said car connecting with said second passage, means for admitting recirculated air from said compartment into said blower, and means for mixing the cold air from said first passage with recirculated air from said second passage and for distributing the mixed air at a plurality of points into said passenger compartment.

SAMUEL M. ANDERSON.